United States Patent
Gaul et al.

(10) Patent No.: US 9,309,861 B1
(45) Date of Patent: Apr. 12, 2016

(54) OCEAN WAVE KINETIC ENERGY CONVERSION METHOD AND SYSTEM

(71) Applicants: Roy D. Gaul, Houston, TX (US); Claude P. Brancart, Brunswick, ME (US); Alfred Kirst, Jr., Plano, TX (US); Vincent L. Gaul, Robinson, IL (US)

(72) Inventors: Roy D. Gaul, Houston, TX (US); Claude P. Brancart, Brunswick, ME (US); Alfred Kirst, Jr., Plano, TX (US); Vincent L. Gaul, Robinson, IL (US)

( * ) Notice: Subject to any disclaimer, the term of this patent is extended or adjusted under 35 U.S.C. 154(b) by 0 days.

(21) Appl. No.: 14/247,231

(22) Filed: Apr. 7, 2014

Related U.S. Application Data

(63) Continuation-in-part of application No. 13/864,269, filed on Apr. 17, 2013, now abandoned.

(51) Int. Cl.
F03B 13/22 (2006.01)
F03B 13/10 (2006.01)

(52) U.S. Cl.
CPC ............. *F03B 13/22* (2013.01); *F03B 13/10* (2013.01)

(58) Field of Classification Search
CPC ......... Y02E 10/28; Y02E 10/38; F03B 13/10; F03B 17/061
USPC ...................................................... 290/43, 54
See application file for complete search history.

(56) References Cited

U.S. PATENT DOCUMENTS

| | | | |
|---|---|---|---|
| 1,766,765 A * | 6/1930 | Savonius | 416/132 R |
| 6,006,518 A | 12/1999 | Geary | |
| 6,172,429 B1 | 1/2001 | Russell | |
| 6,229,225 B1 | 5/2001 | Carroll | |
| 6,982,498 B2 * | 1/2006 | Tharp | 290/54 |
| 7,686,583 B2 | 3/2010 | Siegel | |
| 7,902,687 B2 | 3/2011 | Sauer et al. | |
| 2004/0007881 A1 | 1/2004 | Kobashikawa et al. | |
| 2005/0066654 A1 | 3/2005 | Koivusaari | |
| 2007/0029806 A1 * | 2/2007 | Coman | 290/54 |
| 2007/0108768 A1 | 5/2007 | Dempster | |
| 2008/0116692 A1 | 5/2008 | Lagstrom | |
| 2009/0091134 A1 | 4/2009 | Lyatkher | |
| 2009/0194997 A1 * | 8/2009 | Stabins | 290/54 |
| 2009/0243293 A1 | 10/2009 | Farb | |
| 2010/0084862 A1 | 4/2010 | Unno | |
| 2010/0102570 A1 * | 4/2010 | Boyd-Wilson et al. | 290/55 |
| 2010/0111609 A1 | 5/2010 | Espedal | |
| 2010/0237626 A1 | 9/2010 | Hamner | |
| 2010/0284809 A1 * | 11/2010 | Houlsby et al. | 416/178 |
| 2013/0234436 A1 | 9/2013 | Kii et al. | |

* cited by examiner

*Primary Examiner* — Tulsidas C Patel
*Assistant Examiner* — Sean Gugger
(74) *Attorney, Agent, or Firm* — Kenneth A. Roddy

(57) ABSTRACT

A system and method for producing electrical energy utilizing horizontal axis water turbine assemblies, completely submerged and secured to a foundation on the seafloor beneath ocean surface waves in water depths corresponding to a nominal range of $\frac{1}{30}$th to $\frac{1}{10}$th of the wave lengths of prevailing waves. The water turbine assembly captures kinetic energy of vertically compressed elliptical orbital water particle motion having accentuated horizontal velocity for production of electrical power delivered to an onshore terminal. A group of multiple water turbine assemblies may be disposed at selected distances apart relative to one another and at selected distances from the coastline to form an array spanning a range of surface wave lengths in the shallow water depth to reduce temporal variability and collectively amplify and optimize the electrical power produced by the facility ashore.

3 Claims, 7 Drawing Sheets

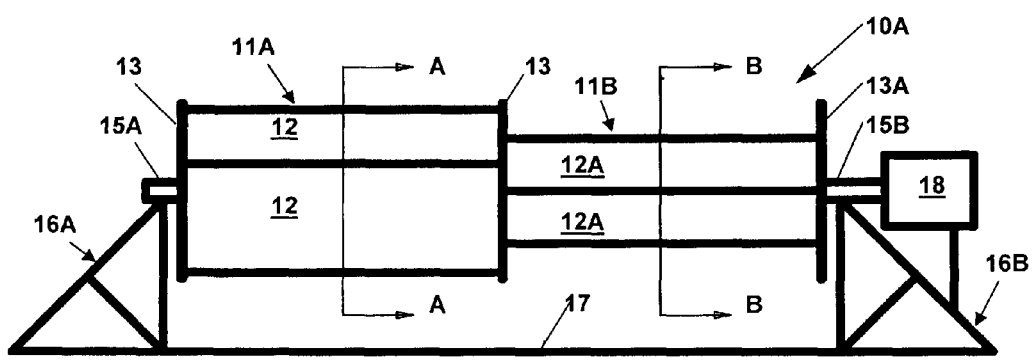
Fig. 3
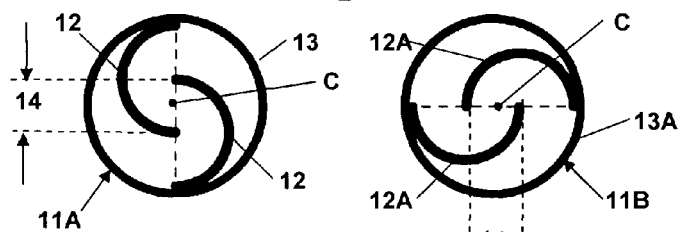
Fig. 3A
Fig. 3B
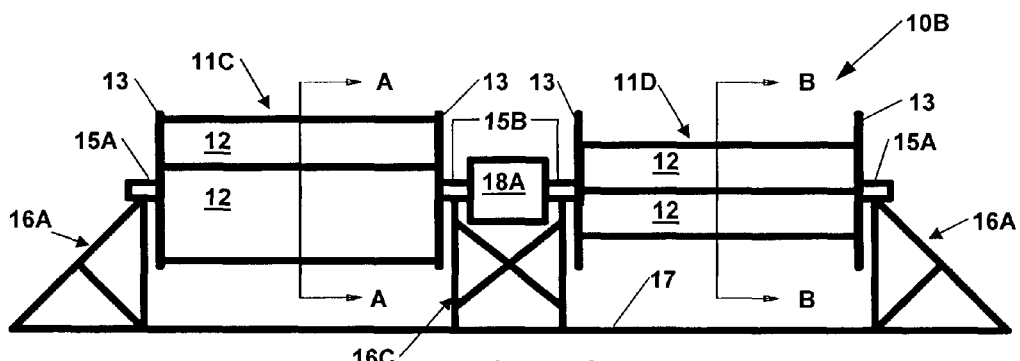
Fig. 4
Fig. 4A
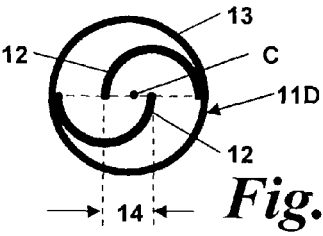
Fig. 4B

OCEAN WAVE KINETIC ENERGY CONVERSION METHOD AND SYSTEM

CROSS-REFERENCE TO RELATED APPLICATION

This application is a Continuation-In-Part of, and claims priority of, U.S. non-provisional application Ser. No. 13/864,269, filed, filed on Apr. 17, 2013, now abandoned.

BACKGROUND OF THE INVENTION

1. Field of the Invention

This invention relates generally to subsea water turbines and methods for extracting energy from ocean surface waves to generate electrical power and, more particularly, to a method using an underwater horizontal axis turbine apparatus supported on the seafloor completely submerged beneath ocean surface waves a distance from a coastline in an operating zone that straddles the division between an intermediate water zone and a shallow water zone where depths from the seafloor to the still water level are approximately in the range of 1/10th to 1/30th of prevailing wave lengths, wherein the turbine apparatus captures kinetic energy of vertically compressed orbital water particle motion for production of electrical power that is delivered to an onshore terminal.

2. Background Art

Mechanisms and methods for capture of ocean surface wave energy (tidal to wind driven frequencies) have been applied to human enterprise for centuries. In recent years emphasis has shifted to development of techniques that can capture the potential energy of wind waves (including swell) in locations where water depths are greater than one-half of the prevailing lengths of wave (known as "deep water"). The depth in these deep water zones is sufficient to avoid loss of potential energy of ocean surface waves due to interaction of the waves with the seafloor. The emerging techniques and systems convert undulations of the sea surface wave action (potential energy) into some form of kinetic energy that can be transformed into electrical energy. Most of the systems produce electrical power at the deep water site and use submarine cables to transmit the power ashore. Others use mechanical energy to pump seawater ashore to a revetment that creates enough hydraulic head for turbines to operate in outflow flumes. The techniques used to capture potential energy of waves are numerous and varied.

There are several patents and published applications directed toward various systems that produce power utilizing apparatus with floatation on or near the water surface. The assemblies are moved vertically by the potential energy of ocean waves which is transferred to electrical generators or other devices, located either on the floating body or under the water surface, to produce useful power for transmission to shore. The following are several examples: Carroll, U.S. Pat. No. 6,229,225; and Dempster, U.S. Patent Publication 2007/0108768.

There are several patents and published applications that disclose pivoting plates that are placed in the vicinity of the seafloor in an ocean and are operated by the reciprocating water mass beneath surface waves to produce power. The following are several examples: Kobashikawa, et al, U.S. Patent Publication 2004/0007881; Koivusaari, U.S. Patent Publication 2005/0066654; and Espedal, U.S. Patent Publication 2010/0111609.

There are several patents and published applications that disclose horizontal axis rotors and turbines having pivoting vanes or blades, airfoil shaped blades, and angularly disposed blades that are utilized to capture energy of a flowing water stream, ocean wave energy, or the reciprocating water mass beneath surface waves to produce power. The following are several examples: Geary, U.S. Pat. No. 6,006,518; Sauer, et al., U.S. Pat. No. 7,902,687; Siegel, U.S. Pat. No. 7,686,583; Lyatkher, U.S. Patent Publication 2009/0091134; and Hamner, U.S. Patent Publication 2010/0237626.

Stabins, U.S. Patent Publication 2009/0194997, discloses a horizontal axis Darrieus water wheel turbine having blades that may be straight or helical, and are held equidistant from the central rotating shaft by blade support members. The blades have an airfoil (Darrieus) cross section and are oriented so that a blade at its rotational apex moves directly opposite to the direction of water flow. The turbine is elevated such that the top portion, where blades travel directly against the direction of water flow, is in the air and above the water level.

Houlsby, et al., U.S. Patent Publication 2010/0284809, discloses a transverse flow water turbine having a horizontal axis. The rotor has a triangulated structure formed by at least three longitudinal blades having an airfoil (Darrieus) cross section supported between end plates along a line that is inclined with respect to the horizontal axis. The principal application envisaged for embodiments of the invention is to extract energy from tidal flows, but the device could equally be deployed in other types of flow, e.g. in rivers, or in flows caused by oceanic currents.

There are several patents and published applications that disclose rotors or turbines that are disposed inside an outer housing which is placed in a flowing water stream or beneath ocean surface waves wherein the housing channels the flowing water across the rotor or turbine to produce power. The following are examples: Farb, U.S. Patent Publication 2009/0243293; and Unno, U.S. Patent Publication 2010/0084862.

Tharp, U.S. Pat. No. 6,982,498, discloses an underwater hydro-electric farm comprising a plurality of electrical generator assemblies, each including a turbine blade/propeller assembly, arranged in a predetermined array on a bottom surface of a body of water within an ocean current path so that the turbine blade/propeller assemblies are caused to rotate as a result of being subjected to kinetic energy caused by the flow of an underwater current. Each of the electrical generator assemblies is removably secured in a cradle and is self contained and modular in configuration such that any of the electrical generator assemblies, including its coupled turbine blade/propeller assembly, is replaceable with another as a combined unit. Each of the electrical generator assemblies is in electrical communication with one another and connected via power transmission lines to a land based power converting facility.

Hydrokinetic turbines are also known that are designed to operate in unidirectional flowing waterways such as rivers, channels, and canals, As an example, Hydrovolts, Inc., of Seattle Wash., has developed several types of small water turbines with various blade configurations that are designed to capture hydrokinetic energy of swift moving unidirectional water flow in artificial waterways such as irrigation canals, that are tethered to the sides of the waterway to float at or near the water surface or to sit at the bottom of the canal. Use of these turbines for capturing the oscillatory water motion associated with surface waves is not disclosed or suggested.

The vertical axis Savonius rotor as a wind energy recovery device has long been used for high torque applications such as pumping water and grinding grain. The rotor unit is typically mounted on a vertical pipe or other support passing vertically through the center of the unit so that the unit revolves around the pipe when the wind blows onto the unit from any direction with sufficient velocity. Thus, the vertical axis Savonius rotor can use wind from any and all directions at all times. A two-bladed Savonius rotor typically operates at relatively low speeds in comparison to some other types of rotors and has usually been considered to be inefficient for electric generating purposes. A rotor that slows air down on one side while speeding it up on the other, as does the Savonius rotor, is subject to the Magnus-effect: lift produces a net transverse component of force on an immovable object or causes an untethered object to deflect from direction of the wind; the same phenomenon applies to a spinning baseball that curves during its flight toward homeplate.

Savonius, U.S. Pat. No. 1,766,765, discloses a vertical axis wind rotor having two oppositely arranged hollow shaped vanes of generally rectilinear generatrix formed by cylindrical, parabolic, helical or other suitable surfaces and arranged so that the inner edge of the vane extends to the segmental space bordered by the other vane, both vanes overlapping each other at their inner edges to form a gap for air passage adapted to force the air current from the hollow side of one vane to the hollow side of the other vane in an S-like path of substantially constant area. The vanes are provided with controllable outlet or inlet openings at places at which changes occur in the direction and one or more flaps on the circumference of the vane, which during normal operations adapt themselves to the curvature of the vanes, but when the rotor exceeds a predetermined speed are placed transversely to the face of the vane and thus uncover the passages, openings or ports for the stream of air. Use of these rotors for capturing the oscillatory water motion associated with surface waves is not disclosed or suggested.

When a Savonius rotor axis is set horizontally and tethered, "kiting" results due to the Magnus-effect. There are several water turbine patents that seek to produce power utilizing either vertical or horizontal axis Savonius type rotors. Most of these float on or near the water surface and are designed to operate in unidirectional flowing waterways such as rivers, channels, and canals. They operate on the principle of utilizing the velocity of the unidirectional flow for power output, rather than capturing the kinetic energy of reciprocating horizontal, vertical, and oblique components of vertically compressed generally elliptical orbit water particle motion beneath overhead ocean surface waves.

Russell, U.S. Pat. No. 6,172,429, discloses a hybrid energy recovery system for recovering energy from the natural and man-made sources of wind, water and sunshine by providing, within a given local area wind, water and solar apparatuses for simultaneously converting energy to produce electrical power from the combination of all three sources. The wind and water apparatuses comprise double speed Savonius rotor electrical generating apparatuses each of which includes two vertical axis Savonius type rotors mounted adjacent to one another for rotation about a common vertical axis with the blades of the rotor units being arranged so that the rotor units rotate in opposite directions relative to one another under the influence of a given wind. In the case of being powered by flowing water, the rotational axis of the rotor units is positioned horizontally with the water being discharged onto the rotor units from above the rotor units from a drain divided into two parts at its lower end to divide the flow of water into two parts each supplied to a respective one of the two rotor units.

Lagstrom, U.S. Patent Publication 2008/0116692, discloses arrangements for converting kinetic energy of ocean currents into electric energy, comprising a floating body carrying at least three longitudinally adjacent Savonius turbines, each of which has at least two blades with a substantially semicircular cross-section for transferring rotary motion of the turbine to an electric power generating unit. The floating body comprises elongated, mutually spaced and interconnected pontoons. One end of the pontoons is tapered inwardly to define a narrowed through-passage for water currents between the pontoons. In one embodiment, the Savonius turbines are suspended vertically across the through-passage so as to extend downwardly from an upper deck into the through-passage. Alternatively, the Savonius turbines are rotatably mounted at opposite ends in the pontoons so as to extend horizontally above each other across the through-passage.

Coman, U.S. Patent Publication 2007/0029806, discloses a floating electricity production unit for producing electricity by harvesting energy from unidirectional flowing water. A paddle wheel is stationarily positioned to penetrate the surface of a body of water, or a plurality of paddle wheels may be deployed on a single floating platform to optimize the transfer of the energy contained in the flow of water passing the floating platform. Water intensifiers having an angular surface are used to narrow the bounded cross section of the unidirectional flow impinging on the paddle wheels from the downstream floating platform. The paddlewheels and the water intensifiers would be incapable of operating in a reversing oscillatory water flow condition associated with the water particle motion beneath ocean surface waves.

The level of power output of turbines that are disposed in unidirectional flowing waterways such as rivers, channels, and canals, is directly related to flow velocity. There are several problems associated with turbines disposed in these locations. Although volumetric flow information may be available for a particular location, the water velocity varies from one potential site to another depending on the cross-sectional area of the waterway. The energy flow at the surface of a stream is higher than at the bottom. In a smooth channel, the water current is fastest at the center, but in a river the current flow varies depending upon the bottom geometry. Thus, the water velocity has a localized and site-specific profile, and location of the rotor dictates the amount of energy that can be produced. In a river, there are competing users of the water stream, such as boats, fishing vessels, bridges, etc., which may limit the effective usable area for a turbine installation. There may also be various types of suspended particles, debris, and materials, such as sand, rocks, and ice, in the waterway that could damage or adversely affect the operation of the turbine, as well as sea life in the vicinity that could raise environmental concerns or prohibit placement of a turbine in the waterway.

DEFINITION OF TERMS

In this specification, the term "current" is a reference to a stream or flow of water within a body of water having a substantially constant flow rate and direction of flow for an extended period of time.

The terms "tidal flow" and "tidal current", are known in the art as: "the water current caused by the tides". Because of the physical processes which occur to generate the tides, there are two high tides and two low tides each day that differ in height on a daily basis due to the changing distance between the earth and the moon augmented by boundary effects of coastal regions.

As used herein, in conjunction with the present invention, the following terms have the meanings given below:

The term "wave" means an undulation of the sea surface that originates from the energy transfer caused by wind blowing over the surface of the water.

The term "wave crest" means the segment of a wave above calm water elevation that takes the form of a ridge with forward oscillatory motion.

The term "wave trough" means the physical depression below calm water elevation that travels between two successive wave crests.

The term "wave period" means the elapsed time for two successive wave crests to pass through a stationary point of reference.

The term "wave length" means the horizontal distance between successive crests or successive troughs of a surface wave.

The term "still water level (SWL)" means the elevation of the calm free surface of the ocean water that is in contact with the atmosphere.

The term "water column" means the vertical continuum between the SWL and the seafloor.

The term "bathymetric contour" means a line of constant depth of the seafloor below the SWL.

The term "deep water zone" means ocean depth in an area where the depth from the seafloor to the SWL is greater than one-half ($\frac{1}{2}$) of the prevailing surface wave length.

The term "intermediate water zone" means ocean depth in an area where the depth from the seafloor to the SWL is less than one-half ($\frac{1}{2}$) of the prevailing surface wave length but greater than one-twenty-fifth ($\frac{1}{25}$) of the prevailing surface wave length.

The term "shallow water zone" means ocean depths in an area where the depth from the seafloor to the SWL is equal to or less than one-twenty-fifth ($\frac{1}{25}$) of the prevailing surface wave length.

The term "surf zone", also known as "breaker zone", means the region in shallow water adjacent to the coastal boundary where incoming ocean waves become unstable enough to reduce height by spilling or breaking into a turbulent state.

The term "operating zone" means the water zone in which the present water turbine assemblies are submerged and operate. More specifically, the "operating zone" is defined as a water zone that straddles the boundary or division between the intermediate water zone and the shallow water zone and encompasses water depths from the seafloor to the still water level that are within the range of approximately $\frac{1}{10}$th to $\frac{1}{30}$th of prevailing wave lengths, and the water particle motion beneath the ocean surface waves in the operating zone is in the form of vertically compressed generally elliptical water particle orbits having accentuated horizontal velocity components. The present turbine apparatus captures the kinetic energy of the vertically compressed orbital water particle motion in this zone.

The term "coast" means the line or zone where the land meets the sea or some other large expanse of water, and the term "coastline" means the shape, outline, or boundary of a coast.

The term "kinetic energy" means the energy associated with movement of water beneath the surface of a wave.

The term "potential energy" means the energy associated with the height of the free surface of water between the crest and trough of a wave.

The term "particle orbit" means the path, in the vertical plane aligned with the direction of wave travel, that would be traced out by a figurative particle of water during the passage of a wave.

Ocean Wave Characteristics

Water and air fall under the general term "fluid". The primary physical contrasts are that water can be considered incompressible and is about 780 times more dense (weight per unit volume) than air. Use of the atmosphere for capture of energy almost exclusively involves interception of the kinetic energy of wind by means of inverse propellers or some form of rotor that produces shaft rotation. The density contrast between the atmosphere and a large body of water (lake, sea or ocean) provides a free surface for transfer of wind energy to generate waves. The wave energy from storms can travel long distances to be dissipated along coastal boundaries.

There is a firm theoretical foundation for the assumption that the total energy of ocean surface waves in deep water is split evenly between potential and kinetic. The kinetic energy of deep water ocean waves decreases exponentially below the sea surface to a depth of about one-half of the wave length. As waves travel into regions where water depth is less than half of the wave length, interaction with the seafloor gradually alters wave height and form while wave period remains constant. The approach towards shallow water causes wave length to decrease and the wave surface to deviate substantially from the deep water sinusoidal form. The total kinetic energy in the deep water column is effectively compressed into the shallower water column while suffering some loss due to interaction with the seafloor along the path of wave travel. The amount of energy loss is dependent on bathymetry and physical properties of the seafloor. These features are site dependent and vary over a wide range. As the water depth decreases to the vicinity of the division between intermediate and shallow water, the vertical distribution of kinetic energy becomes more nearly constant between the still water level (SWL) and the seafloor. The deformed crests of storm waves and of waves approaching the surf zone have much higher magnitude of kinetic energy above the SWL than near the seafloor.

As deep water waves move into the intermediate and shallow water zones, the circular orbits of the water particles become flattened in elliptical orbits with elongated horizontal axes as the waves begin to "feel" the seafloor. The shallower the water, the flatter the ellipse. In the intermediate zone, the orbits are only slightly elliptical. In the shallow water zone, the elliptical orbits become flatter with more horizontal back and forth motion and accentuated horizontal velocity.

SUMMARY OF THE INVENTION

The present invention is distinguished over the prior art in general, and the above noted patents in particular, by a method and system for capturing oscillatory kinetic ocean wave energy that utilizes horizontal axis rotor turbine assemblies completely submerged and mounted on foundations secured to the seafloor a distance from a coastline beneath the ocean surface waves in an operating zone that straddles the boundary, division, or transition, between the intermediate water zone and the shallow water zone and encompasses water depths from the seafloor to the still water level that are within the range of approximately $\frac{1}{10}$th to $\frac{1}{30}$th of prevailing wave lengths where the water particle motion beneath the ocean surface waves in the operating zone is in the form of vertically compressed generally elliptical water particle orbits having accentuated horizontal velocity components. Thus, the operating zone extends away from the coastline into the intermediate water zone to water depths between the seafloor and the still water level approximately equal to $\frac{1}{30}$th of prevailing wave lengths and extends towards the coastline into said shallow water zone to water depths approximately equal to $\frac{1}{10}$th of the prevailing wave lengths of the ocean surface waves. In other words, the shallowest depth of the operating zone ($\frac{1}{30}$th of the prevailing wave length) is located just inside of the beginning of the shallow water zone, and the deepest depth of the operating zone (1/10th of the prevailing wave length) is located inside the intermediate water zone.

The water turbine assemblies include at least one elongate rotor having a central horizontal axis and a pair of fixed longitudinal vanes of concave cross section extending parallel to the horizontal axis secured between circular end plates configured to rotate the rotor in one direction about the horizontal axis responsive to accentuated kinetic energy of reciprocating horizontal, vertical, and oblique components of vertically compressed generally elliptical orbit water particle motion beneath overhead ocean surface waves in the operating zone. Conversion of the kinetic energy is accomplished by means of an electrical generator operatively connected with the rotor that converts the rotational energy of the rotor into electrical power for delivery to an onshore terminal.

Said water turbine assemblies are positioned such that the horizontal axis of the rotor is in a plane generally parallel to bathymetric contours in the vicinity of the turbine assembly to facilitate exposure and alignment of the rotor with the horizontal, vertical, and oblique components of the vertically compressed generally elliptical water particle orbits during passage and refraction of the overhead ocean surface waves in the operating zone.

In preferred embodiments the water turbine assemblies utilize a modified Savonius type rotor wherein the diameter is minimized to stay within acceptable dimensions dictated by available water depth and the length of the vanes is dictated by desired power capacity of the system. The overall length of the rotor generally is several times larger than its diameter; preferably the length is at least five times the diameter. The water turbine has a pair of longitudinal vanes of semicircular cross section secured in opposed facing relation between circular end plates with inner and outer longitudinal edges on a line that bisects the center of the circular plates and passes through the central horizontal axis of rotation of the rotor with concave surfaces oriented in the direction of rotation. The vanes are diametrically offset along the line that bisects the center of the circular plates such that the outer longitudinal edges of the concave vanes are adjacent to the circumference of the circular end plates, and the inner longitudinal edges of the concave vanes are spaced apart in overlapped relation relative to one another so as to define a water passageway between the opposed facing vanes. The passageway may have a width equal to the vane radius such that the maximum diameter of the pair of vanes is 1.5 times the open width of a single vane. Preferred embodiments of the horizontal axis water turbine apparatus include single-rotor and dual-rotor configurations. The projected area term used in calculation of power generated by the rotor is its maximum diameter multiplied by length of the vanes.

The turbine rotor turns on a horizontal shaft which is journaled in a bearing assembly at a desired elevation above a foundation imbedded in the seafloor in the operating zone at a depth beneath the still water level such that said turbine rotor is completely submerged in the lower half of a vertical water column between the seafloor and the still water level so as to remain submerged and operational during passage of maximum wave crests and troughs of overhead ocean surface waves associated with storm conditions. Clearance between the bottom of the rotor and the seafloor is preferably less than one-half of the diameter of the rotor. Electrical power cables and control lines interconnect the electrical generators with a power control and distribution station ashore.

A water flow diverting ramp may be secured to the seafloor on the coastal facing side of a water turbine assembly and is disposed generally parallel to and offset from the rotor. The ramp has a generally convex curved top surface with a suitable hydrodynamic curvature configuration to accelerate flow moving away from the coastline due to the horizontal orbital component of the vertically compressed generally elliptical water particle motion as it passes between the rotor vanes and the seafloor, thereby increasing power production during passage of incoming wave troughs. The ramp has negligible effect on rotation and power production during passage of wave crests when the horizontal component of orbital motion is reversed.

Another aspect of this invention is the use of a plurality of horizontal axis water turbine assemblies at selected distances apart relative to one another in the operating zone to form an array with the horizontal axis of each rotor positioned in a plane generally parallel to bathymetric contours in the vicinity of the respective water turbine assembly to facilitate exposure and alignment of the rotors with the horizontal, vertical, and oblique components of the vertically compressed generally elliptical water particle orbits during refracted passage of overhead ocean surface waves. Such an array covers a spectral spread of ocean surface wave lengths prevailing in the operating zone, thereby reducing temporal variability of power generated and collectively amplifying and optimizing power production and delivery.

The present method takes advantage of the vertical compression of kinetic energy as ocean waves travel from deep water into shallow water. This vertical compression results in uniformity and magnification of the elliptical flow velocity structure in the lower half of the water column such that the vertical extent of an energy conversion system is small compared to the requirement for a kinetic energy conversion system positioned in deep water. The horizontal component of water velocities in the lower half of the water column also experiences a smaller range of excursions than velocities near the water surface during passage of wave crests.

Another result of incoming wave interaction with the seafloor is change in direction of travel. The wave crests tend to become generally aligned with bathymetric contours. The visual manifestation of this refraction process is the surf zone which is aligned generally parallel to the coastline. The present method and system takes advantage of the alignment of wave crests in the aforesaid operating zone such that the turbine apparatus, mounted on a foundation affixed to or on the seafloor, can operate with its horizontal axis generally parallel to the bathymetric contours in the vicinity of the turbine. Such an arrangement allows use of a fixed orientation turbine that has maximum response to energy received perpendicular to its axis of rotation.

One of the significant features and advantages of the present method and system of capturing kinetic energy in the operating zone by means of horizontal axis water turbines is that such rotors can respond to water movement from any and all orientations in the vertical plane transverse to the rotor axis. This feature enables the rotor to collect the vector sum of energy distributed across its aperture at all phase positions beneath an incoming wave profile.

Another significant feature and advantage of the present method and system is that the system provides half-wave rectification such that the magnitude of energy peaks at the wave crests is preserved and energy related to troughs provides an intervening maximum. Wave surface crossings at the still water level (SWL) usually are of short duration (less than one second) so power output of turbine assemblies generally will be continuous in the presence of significant wave action.

Another significant feature and advantage of the present method and system is that the power conversion system and its seafloor foundation can be sized and adapted to a wide range of sites and wave climates.

Another significant feature and advantage of the present method and system is that it does not require control surfaces or movement of the rotor vanes to limit rotation rate in high waves and/or strong ocean currents.

Another significant feature and advantage of the present method and system is that the rotor can be of durable construction with high inertia that contributes to favorable longevity as well as continuous power production in the oscillatory wave motion environment.

Another significant feature and advantage of the present method and system is that the rotor is positioned sufficiently below the sea surface to assure continuous submergence in severe storm conditions and to avoid the highest particle velocities associated with the passage of storm wave crests.

Further significant features and advantages of the present method and system are that, unlike techniques that extract power solely from the potential energy of deep water ocean surface waves, the present invention is less complex, operates more efficiently in refracted waves than deep water systems that frequently are exposed to multi-directional waves, has shorter cable runs to shore, and is less costly to own and operate.

Still further significant features and advantages of the present method and system are that the physical nature of the rotor and its operating characteristics are compatible with divers, surfers, small boat operations, and other recreational activities in the coastal environment.

Other significant features and advantages of the invention will become apparent from time to time throughout the specification and claims as hereinafter related.

BRIEF DESCRIPTION OF THE DRAWINGS

FIG. 3 is a side elevation view illustrating, somewhat schematically, a dual-rotor embodiment of the horizontal axis water turbine assembly utilizing modified Savonius type rotors in accordance with the present invention.

FIGS. 3A and 3B are transverse cross sectional views taken along line A-A of the first rotor and line B-B of the second rotor, respectively, of the dual-rotor embodiment of the horizontal axis water turbine apparatus of FIG. 3.

FIG. 4 is a side elevation view illustrating, somewhat schematically, a second dual-rotor embodiment of the horizontal axis water turbine assembly utilizing modified Savonius type rotors in accordance with the present invention wherein a generator is operatively connected between the first and second rotors.

FIGS. 4A and 4B are transverse cross sectional views taken along line A-A of the first rotor and line B-B of the second rotor, respectively, of the dual-rotor embodiment of the horizontal axis water turbine apparatus of FIG. 4.

DESCRIPTION OF THE INVENTION

The present invention is directed toward a method of producing electrical power from kinetic energy of oscillatory water motion caused by ocean waves approaching a coastline. The preferred mechanism for conversion of the energy is a system utilizing horizontal axis rotor turbine apparatus, mounted on a foundation affixed to or on the seafloor, for capturing energy and producing electrical power delivered to a terminal ashore by means of a cable connected network and associated control and conditioning equipment. Ocean surface waves, characteristics of waves altered by interaction with the seafloor, and transformations of water particle orbits as waves travel from deep to shallow water were discussed briefly above. For a better understanding and appreciation of their relevance to the present invention, these characteristics and transformations are illustrated and described in more detail with reference to FIGS. 1 and 1A.

Figure 1:
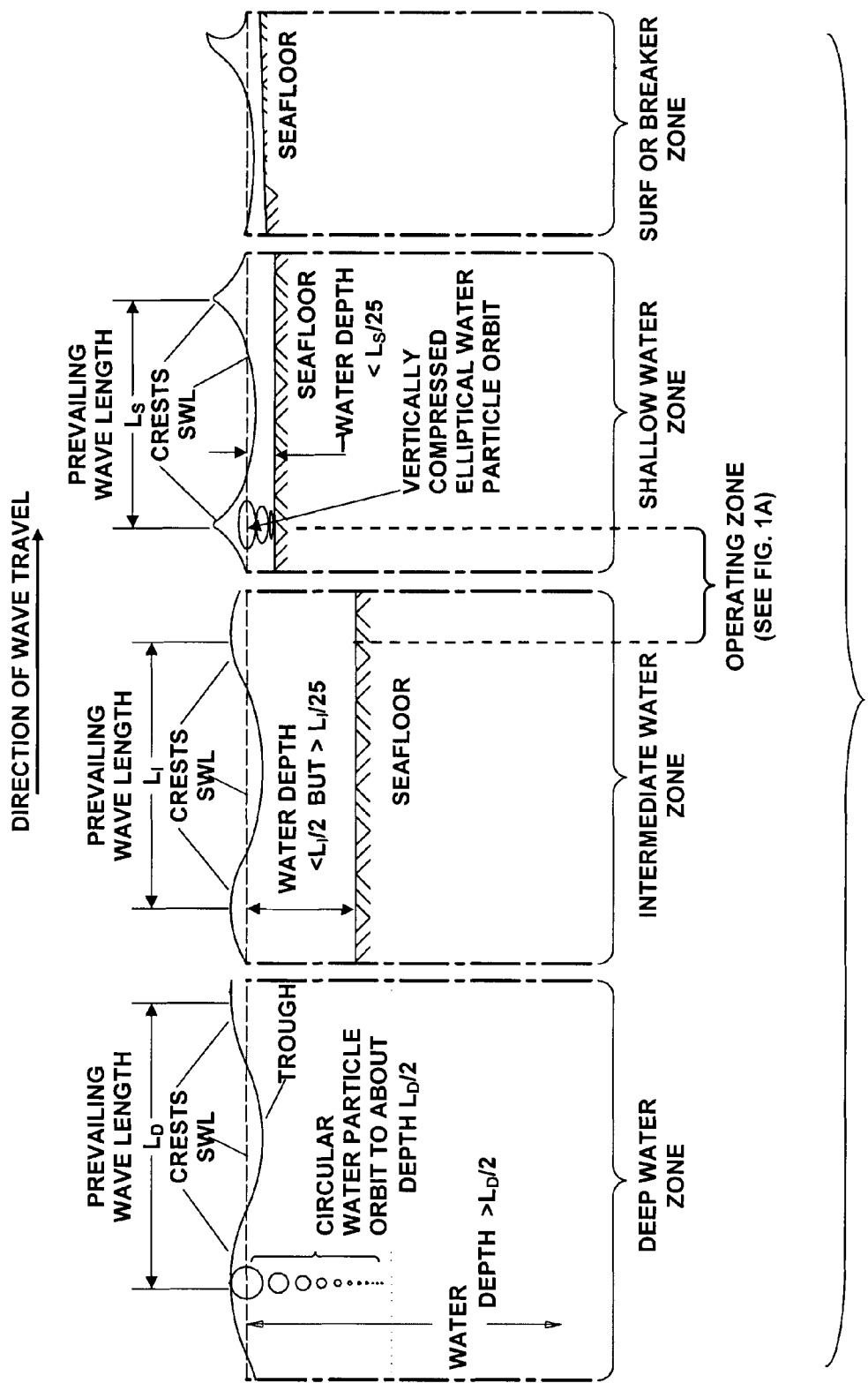
FIG. 1 is a simplified schematic cross section that illustrates the segregation of ocean water depths into deep water, intermediate water, shallow water, and surf zones and the transformation of wave characteristics and underlying water particle orbits in the zones due to interaction with the seafloor during the approach of waves from the open ocean to shore. An operating zone in accordance with the present invention is shown that encompasses the boundary between the intermediate and shallow water zones.

FIG. 1 is a simplified and somewhat idealized illustration of the transformation of ocean waves during transit ashore over a rising seafloor. Interaction with the seafloor in the intermediate and shallow zones alters the wave form and energy conservation causes water particle orbits that are circular in deep water to become elliptical in shallow water before suffering severe distortion in the surf zone. In the deep water zone, the depth of the ocean from the seafloor to the still water level (SWL) is in excess of one-half ($\frac{1}{2}$) of the prevailing surface wave length "$L_D$", represented as "$>L_D/2$". In the deep water zone, the water particles move in circular orbits when a wave passes. The diameter of the circular orbits is equal to the prevailing wave height at the water surface and falls off sharply with depth until it essentially is negligible at a depth of about one-half ($\frac{1}{2}$) of the prevailing wave length in the deep water zone. In general, there is no net shoreward mass transport of water associated with deep water waves.

In the intermediate water zone, the depth of the ocean from the seafloor to the still water level (SWL) is less than one-half ($\frac{1}{2}$) of the prevailing surface wave length, $<L_I/2$, but greater than one-twenty-fifth ($\frac{1}{25}$) of the prevailing wave length, represented as "$>L_I/25$". In the shallow water zone the depth of the ocean from the seafloor to the still water level (SWL) is equal to or less than one-twenty-fifth (1/25) of the prevailing wave length, represented as "≤$L_S$/25".

As deep water waves move into the intermediate and shallow water zones, the circular orbits of the water particles become flattened in elliptical orbits with elongated horizontal axis as the waves begin to "feel" the seafloor. The shallower the water, the flatter the ellipse. In the intermediate zone, the orbits are only slightly elliptical. In the operating zone, the elliptical orbits become flatter with more horizontal back and forth motion and accentuated horizontal velocity, as shown schematically in FIG. 1A.

The illustration of FIG. 1 is somewhat idealistic in that it portrays a single wave train of constant period and height that is rarely simulated in the actual environment. Such a wave train would be known as "swell" that emerged into a calm region from a very distant storm. It also would be necessary for the wave train to make the entire transit to shore under calm conditions. The more realistic situation is that the sea surface wave form is very irregular and can best be represented by a combination of wave trains. Very well established mathematical techniques are available to create spectral representations as a function of wave period. As waves travel shoreward, the wave period remains constant to the point of wave spilling or breaking which is part of the mechanism for transfer from potential to kinetic energy. Wave length becomes shorter as the waves slow down due to bottom interaction. The present invention has the capability of responding to the kinetic properties of irregular waves modified by interaction with the seafloor and to extract energy over the entire period range of waves that typically are useful for commercial energy applications.

Another pertinent consideration is that the distance from the coastline to the surf zone is variable. In the presence of very low wave energy the surf zone can be only a few feet wide and barely visible. As the surf builds, the width and intensity of the zone changes while it migrates away from the shoreline. The quantitative characteristics of the surf depend on the bathymetry as well as the spectral properties of the waves. For some sites and environmental conditions it is probable that in some installations of the water turbines of the present invention may be exposed to operation both within and outside of the surf zone. Under all of these conditions, a system installed at depths less than one-half of the still water depth will remain completely submerged.

Figure 1A:
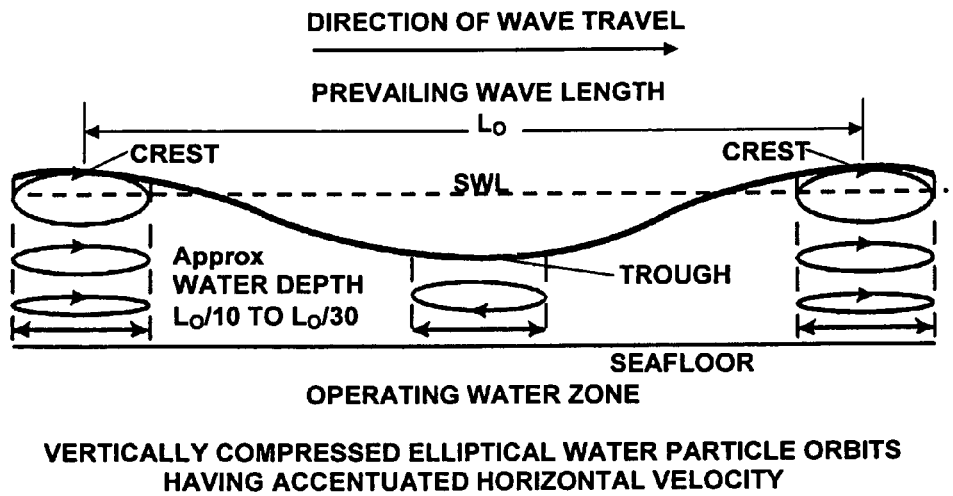
FIG. 1A is a simplified schematic cross section that illustrates the operating zone in accordance with the present invention along with the water depth range and elliptical water particle orbits due to interaction with the seafloor within the operating zone.

Referring additionally to FIG. 1A, the present method and system captures kinetic energy of vertically compressed orbital particle motion beneath ocean surface waves by means of one or more submerged horizontal axis rotor turbine assemblies positioned in an operating zone defined as a zone that straddles the boundary, division, or transition, between the intermediate water zone and the shallow water zone and encompasses water depths from the seafloor to the still water level (SWL) that are within the range of approximately 1/10th to 1/30th of prevailing surface wave lengths "$L_O$", represented as "$L_O$/10" and "$L_O$/30", and the water particle motion beneath the ocean surface waves in the operating zone is in the form of vertically compressed generally elliptical water particle orbits having accentuated horizontal velocity components. Thus, the operating zone extends away from the coastline into the intermediate water zone to water depths between the seafloor and the still water level approximately equal to 1/10th of prevailing wave lengths "$L_O$/10" and extends towards the coastline into said shallow water zone to water depths approximately equal to 1/30th of the prevailing wave lengths of the ocean surface waves "$L_O$/30". In other words, the shallowest depth of the operating zone (1/30th of the prevailing wave length) is located inside of the shallow water zone, and the deepest depth of the operating zone (1/10th of the prevailing wave length) is located inside the intermediate water zone.

The horizontal axis water turbine assemblies include at least one modified Savonius type rotor having a central horizontal axis and fixed elongate longitudinal vanes configured to rotate the rotor in one direction about the central horizontal axis responsive to kinetic energy of reciprocating horizontal, vertical, and oblique components of vertically compressed generally elliptical orbit water particle motion during passage of overhead ocean surface waves, and an electrical generator operatively connected with the rotor to convert rotational energy of the rotor into electrical energy for delivery to an onshore terminal.

Figure 2:
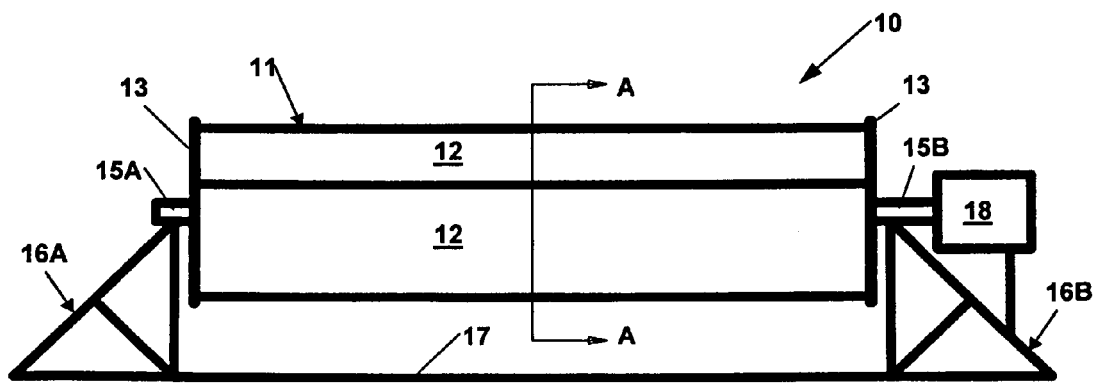
FIG. 2 is a side elevation view illustrating, somewhat schematically, a single-rotor preferred embodiment of the horizontal axis water turbine assembly utilizing a modified Savonius type rotor in accordance with the present invention assembled for submerged operation.
Figure 2A:
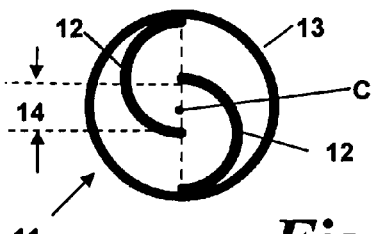
FIG. 2A is a transverse cross section view of the rotor segment taken along line A-A of FIG. 2.

FIGS. 2 and 2A are a side elevation view and a transverse cross sectional view, respectively, illustrating, somewhat schematically, a single rotor preferred embodiment of the horizontal axis water turbine assembly 10 utilizing a modified Savonius type rotor 11 in accordance with the present invention assembled for submerged operation. The modified Savonius type rotor 11 is comprised of two elongate longitudinal half cylinders or semicircular vanes 12 fixedly secured at opposed ends between two circular end plates 13. As best seen in FIG. 2A, the longitudinal vanes 12 are of semicircular cross section secured in opposed facing relation between the circular end plates 13 with their inner and outer longitudinal edges on a line (indicated by dashed line) that bisects the center C of the circular end plates and passes through the central horizontal axis of rotation of the rotor with their concave surfaces oriented in the direction of rotation. The semicircular vanes 12 are diametrically offset along the line that bisects the center of the circular end plates 13 such that their outer longitudinal edges are adjacent to the circumference of the circular end plates, and their inner longitudinal edges are spaced apart in overlapped relation relative to one another a distance beyond the center of said circular plates defining a gap 14 there between. The gap 14 between the opposed facing offset vanes 12 forms the passageway for fluid movement. In the preferred embodiment, but not limited thereto, the gap 14 has a width equal to the vane radius such that the maximum diameter of the pair of vanes 12 is 1.5 times the diameter of a single vane. The elongate rotor 11 has a length between the end plates 13 that typically is at least five times the rotor diameter. A shaft extends outwardly from each end plate 13 in axial alignment with the central horizontal axis of rotation of the rotor and each is rotatably journaled in a respective bearing assembly 15A and 15B having structural and mechanical components that allow rotation of the shafts and restrain axial movement of the rotor. The rotor 11 and bearing assemblies 15A and 15B are supported on support structures 16A and 16B, respectively, anchored to a foundation 17 that rests in or on the seafloor. The shaft at one end of the rotor 11 extends through the bearing assembly 15B and is connected with the rotational component of an electrical generator 18 that is supported by the support structure 15B. The rotor vanes 12 and end plates 13 may be constructed of high density materials (e.g., steel).

The single rotor water turbine embodiment 10 of FIGS. 2 and 2A minimizes capital and operating costs and facilitates sizing and positioning for operation at depths in close proximity to the division between intermediate and shallow water zones; namely, typically in the range of 1/10th to 1/30th of the prevailing wave length. The vertical elevation restriction of operating in the lower half of the shallow water column imposes the necessity of rotor elongation to balance power generation capacity against operational requirements. Prior art related to the vertical axis Savonius rotor has involved studies and experimentation with rotors usually having a length to diameter ratio in the range of 2 to 3. One conclusion drawn from such studies is that a ratio of 2.5 is optimum for performance in harnessing wind energy. Conditions for operation of the present invention in the operating zone that straddles the division between intermediate and shallow water indicate that vanes having a diameter limited by water depth and a length five (5) or more times the diameter is preferred for an "elongate" rotor. A preferred embodiment of the rotor also consists of a single rotor containing two vanes. These considerations, together with others previously discussed, are unique attributes of the present method of extracting energy from the kinetic energy of reciprocating horizontal, vertical, and oblique components of vertically compressed generally elliptical orbit water particle motion beneath overhead ocean surface waves in the operating zone.

Prior art has established that a single rotor of the Savonius type tends to stall when the velocity of incoming fluid flow falls below a minimum threshold. This effect is to due to well known variation of torque, which depends on the position of the vanes relative to direction in the vertical plane of incoming fluid flow. The present invention anticipates the option of constructing the rotor of high density materials (e.g., steel) that will tend to circumvent this tendency to stall in the ocean wave environment due to the consequent increase of rotational inertia. Furthermore, the magnitude of the vertical component of velocity in the orbital ellipse is substantially less than the horizontal component. The horizontal component occurs in the onshore direction during passage of the wave crest and in the offshore direction during passage of the trough. Time for a total elliptical cycle (period of the wave) typically is in the range of less than ten seconds to as much as twenty seconds for ocean wave spectra of interest for energy conversion. The duration of low velocity intervals when the horizontal water motion is reversing typically is a second or two. The combination in this invention of orbital shallow water motion acting on the single tier elongate rotor, coupled with its inertia, gives high assurance of continuous rotation under oscillatory operating conditions that are suitable for commercial power production.

Referring now to FIGS. 3, 3A, and 3B, there is shown, somewhat schematically, a dual-rotor embodiment of the horizontal axis water turbine assembly 10A in accordance with the present invention, wherein the components that are the same or similar to those described above are assigned the same numerals of reference. The dual-rotor embodiment of the horizontal axis water turbine assembly 10A utilizes a first modified Savonius type rotor 11A and an adjoined second modified Savonius type rotor 11B. The first rotor 11A is substantially similar to the previously described single rotor.

The first rotor 11A is comprised of two longitudinal half cylinders or semicircular vanes 12 fixedly secured at opposed ends between two circular end plates 13. As best seen in FIG. 3A, the longitudinal vanes 12 are of semicircular cross section secured in opposed facing relation between the circular end plates 13 with their inner and outer longitudinal edges on a line (indicated by dashed line) that bisects the center C of the circular end plates and passes through the central horizontal axis of rotation of the rotor with their concave surfaces oriented in the direction of rotation. The semicircular vanes 12 are diametrically offset along the line that bisects the center of the circular end plates 13 such that their outer longitudinal edges are adjacent to the circumference of the circular end plates, and their inner longitudinal edges are spaced apart in overlapped relation relative to one another a distance beyond the center of the circular plates defining a gap 14 there between. The gap 14 between the opposed facing offset vanes 12 forms the passageway for fluid movement. In a preferred embodiment, but not limited thereto, the gap 14 has a width equal to the vane radius such that the maximum diameter of the pair of vanes 12 is 1.5 times the diameter of a single vane.

The adjoined second rotor 11B is also comprised of two longitudinal half cylinders or semicircular vanes 12A fixedly secured at one end to one end plate 13 of the first rotor 11A and at their opposed ends to a third end plate 13A. As shown in FIG. 3B, the longitudinal vanes 12A of the second rotor 11B are also of semicircular cross section secured in opposed facing relation between the circular end plates 13 and 13A with their inner and outer longitudinal edges on a line (indicated by dashed line) that bisects the center C of the circular end plates and passes through the common central horizontal axis of rotation of the dual-rotor with their concave surfaces oriented in the direction of rotation. The semicircular vanes 12A are diametrically offset along the line that bisects the center of the circular end plates 13 such that their outer longitudinal edges are adjacent to the circumference of the circular end plates, and their inner longitudinal edges are spaced apart in overlapped relation relative to one another a distance beyond the center of the circular plates defining a gap 14 there between. The gap 14 between the opposed facing offset vanes 12 forms the passageway for fluid movement. In a preferred embodiment, but not limited thereto, the gap 14 has a width equal to the vane radius such that the maximum diameter of the pair of vanes 12 is 1.5 times the diameter of a single vane. As best seen in FIGS. 3A and 3B, in this embodiment, the line (dashed line) that bisects the center of the center of the circular end plates of the second rotor 11B is disposed at an angle of ninety degrees relative to the line that bisects the circular end plates of the first rotor 11A (FIG. 3B) such that the vanes 12A of the second rotor are disposed at an angle of ninety degrees relative to the vanes 12 of the first rotor (FIG. 3A).

Similar to the previously discussed single-rotor embodiment, a shaft extends outwardly from the outer end plate 13 of the first rotor 11A and the outer end plate 13A of the second rotor 11B in axial alignment with the central common horizontal axis of rotation of the rotor assembly and each is rotatably journaled in a respective bearing assembly 15A and 15B having structural and mechanical components that allow rotation of the shafts and restrain axial movement of the rotor assembly. The rotors 11A and 11B and bearing assemblies 15A and 15B are supported on support structures 16A and 16B anchored to a foundation 17 that rests in or on the seafloor. The shaft at the outer end of the rotor 11B extends through the bearing assembly 15B and is connected with the rotational component of an electrical generator 18 that is supported by the support structure 16B. The rotor vanes 12 and end plates 13, 13A, may be constructed of high density materials (e.g., steel).

FIGS. 4, 4A, and 4B, show, somewhat schematically, a second dual-rotor embodiment 10B of the horizontal axis rotor turbine apparatus in accordance with the present invention which utilizes a pair of single-rotor horizontal axis Savonius type rotor turbines, as previously shown and described with reference to FIGS. 2 and 2A, wherein a generator is operatively connected between the first and second rotors. To avoid confusion, the first and second rotors are assigned reference numerals 11C and 11D, respectively. The components that are the same or similar to those described previously are assigned the same numerals of reference.

In this embodiment, the first rotor 11C and the second rotor 11D are each comprised of a pair of longitudinal half cylinders or semicircular vanes 12 secured at opposed ends between two circular end plates 13. As shown in FIG. 4A, the longitudinal vanes 12 of the first rotor 11C are of semicircular cross section secured in opposed facing relation between the circular end plates 13 with their inner and outer longitudinal edges on a line (indicated by dashed line) that bisects the center C of the circular end plates and passes through the central horizontal axis of rotation of the rotor with their concave surfaces oriented in the direction of rotation. The semicircular vanes 12 are diametrically offset along the line that bisects the center of the circular end plates 13 such that their outer longitudinal edges are adjacent to the circumference of the circular end plates, and their inner longitudinal edges are spaced apart in overlapped relation relative to one another a distance beyond the center of the circular plates defining a gap 14 there between. The gap 14 between the opposed facing offset vanes 12 forms the passageway for fluid movement. In a preferred embodiment, but not limited thereto, the gap 14 has a width equal to the vane radius such that the maximum diameter of the pair of vanes 12 is 1.5 times the diameter of a single vane.

Similarly, as shown in FIG. 4B, the semicircular vanes 12 of the second rotor 11D are also secured in opposed facing relation between two circular end plates 13 with their inner and outer longitudinal edges on a line (indicated by dashed line) that bisects the center C of the circular end plates and passes through the central horizontal axis of rotation of the rotor with their concave surfaces oriented in the direction of rotation. The semicircular vanes 12 are diametrically offset along the line that bisects the center of the circular end plates 13 such that their outer longitudinal edges are adjacent to the circumference of the circular end plates, and their inner longitudinal edges are spaced apart in overlapped relation relative to one another a distance beyond the center of the circular plates defining a gap 14 there between. The gap 14 between the opposed facing offset vanes 12 forms the passageway for fluid movement. In a preferred embodiment, but not limited thereto, the gap 14 has a width equal to the vane radius such that the maximum diameter of the pair of vanes 12 is 1.5 times the diameter of a single vane.

As best seen in FIGS. 4A and 4B, in this embodiment, the line (dashed line) that bisects the center C of the circular end plates of the second rotor 11D is disposed at an angle of ninety degrees relative to the line that bisects the circular end plates of the first rotor 11C (FIG. 4B) such that the vanes 12A of the second rotor are disposed at an angle of ninety degrees relative to the vanes 12 of the first rotor (FIG. 4A).

The first and second rotors 11C and 11D each has a length between the end plates 13 that may be several times the rotor diameter. A first shaft extends outwardly from the outer facing end plate 13 of each rotor 11C, 11D, respectively, in axial alignment with the common central horizontal axis of rotation of the rotors and is rotatably journaled in a respective bearing assembly 15A having structural and mechanical components that allow rotation of the shafts and restrain axial movement of the rotors. The outer ends of the first and second rotors 11C, 11D, and the bearing assemblies 15A are supported on respective support structure 16A anchored to a foundation 17 that rests in or on the seafloor. A second shaft extends outwardly from the inner facing end plate 13 of each rotor 11C, 11D, respectively, in axial alignment with the common central horizontal axis of rotation of the rotors and each is rotatably journaled in a respective bearing assembly 15B having structural and mechanical components that allow rotation of the shafts and restrain axial movement of the rotors. The second shafts at the inner facing ends of the rotors 11C, 11D, extend through the bearing assemblies 15B and each is connected with the rotational component of an electrical generator 18A that is supported by a support structure 16C disposed between the first and second rotors, and anchored to the foundation 17 that rests in or on the seafloor.

The primary advantage of the dual-rotor embodiments of FIGS. 3 and 4 compared to the single rotor preferred embodiment of FIG. 2 is that the diametrical arrangement of the dual rotor configurations assures that the torque will be positive at all approach angles of fluid flow. The additional complexity of the dual-rotor embodiments may be offset for some applications by the use of lightweight construction of the vanes and end plates. The dual-rotor embodiments may also be employed in regions of marginal wave intensity.

In the embodiments of the horizontal axis rotor turbine assemblies described above, the electrical generator assemblies 18, 18A, consist of DC generators interconnected via electrical cables and control lines for distribution of power to a station ashore (described hereinafter). Multiple rotor turbine assemblies may be arranged to form an array wherein the elements of the array are spatially distributed in relation to the incoming wave climate (phase positions within the surface wave form) such that the summation of the time varying power is more nearly constant than would be produced by a single larger rotor. The positioning of the rotor turbine assemblies in an array and a field of arrays is such that each interval between assemblies is a fraction of the range of wave lengths appropriate to the climatology of a particular site.

Figure 5:
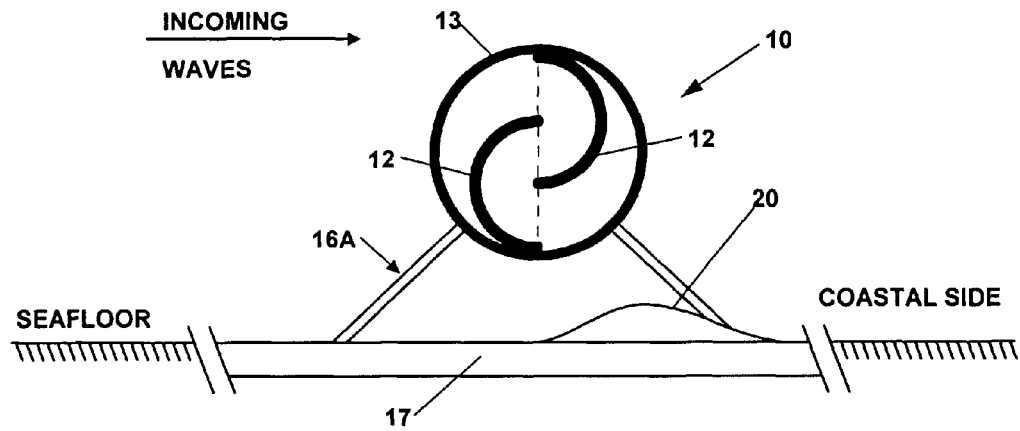
FIG. 5 is a transverse cross section view through the preferred embodiment of the water turbine assembly of FIG. 2 illustrating, somewhat schematically, the foundation and rotor wherein the foundation has been augmented with a water flow diverting ramp structure to accelerate water velocity into the rotor vanes during passage of a wave trough.

FIG. 5 shows somewhat schematically a water flow diverting ramp structure 20 which may be an appendage to any of the embodiments of the horizontal axis Savonius type rotor turbine assemblies described above. For purposes of example only, the water flow diverting ramp structure 20 is illustrated in use with the preferred single rotor embodiment 10 of FIG. 2. The water flow diverting ramp structure 20 is secured to the foundation or support structure only on the coastal facing side of the rotor turbine assembly generally parallel to the longitudinal vanes 12 and offset from the rotor 10 and typically extends the length of the rotor, i.e., the span between the end plates 13. The water flow diverting ramp 20 is shown disposed on the coastal side of the rotor 10 with the additional requirement that the rotor must be oriented such that the upper vane 12 is open to incoming waves. In transverse cross section, the water flow diverting ramp structure 20 has a hydrodynamic generally convex curved top surface configured to accelerate water flow into the lower vane 12 of the rotor during passage of the trough of incoming waves when horizontal orbital water particle motion bounded by the seafloor is oriented away from the coast, thereby increasing power production. The ramp has negligible effect on power production when orbital motion is reversed and flow is towards the coast during passage of wave crests. The water flow diverting ramp structure 20, oriented as specified herein, significantly enhances rotor performance during passage of wave troughs which tends to compensate for the higher peak power (orbital velocity) that occurs during passage of the wave crest.

Figure 6:
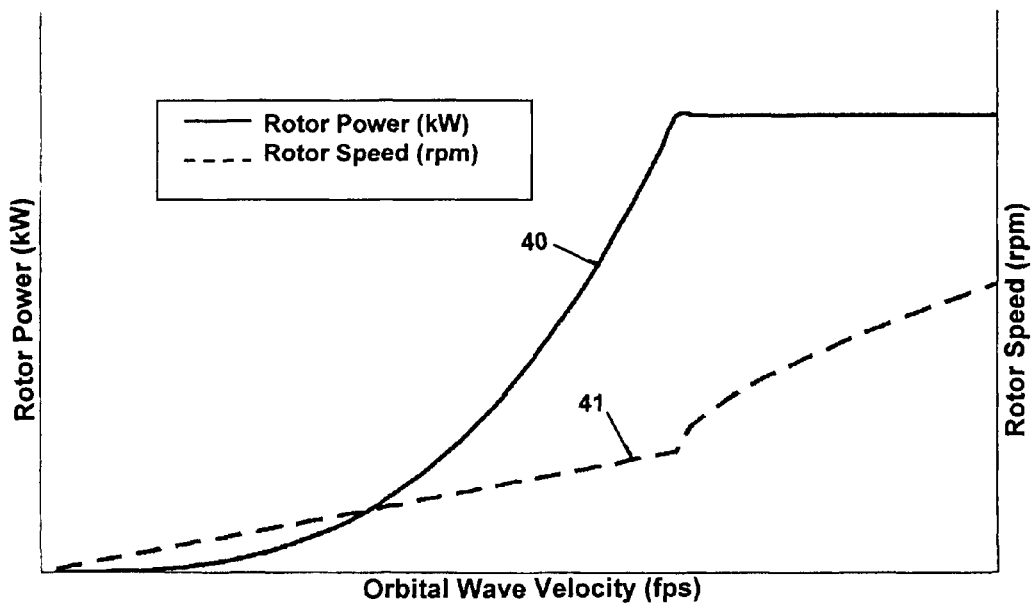
FIG. 6 is a graph illustrating a representative example of achievable rotor power and rate of rotation as a function of water velocity orthogonal to the rotor axis for any and all of the embodiments of the present invention.

The graph of FIG. 6 shows a representative example of achievable rotor power and rate of rotation as a function of water velocity orthogonal to the rotor axis. The general form of these curves is applicable to any and all of the embodiments of the present invention. For the design alternative selected for FIG. 6, power produced by the rotor is shown in the ascending segment of 40, which rises as a function of the cube of the orbital water velocity. The maximum generating capacity, dictated by design, is held constant at water velocities higher than the point of intersection of the two segments. This is one design alternative; other options can be achieved by controlled loading of the system. The associated rotation rate 41 of the turbine increases linearly up to the velocity corresponding to the maximum power output. The slope of the rotation curve 41 increases nonlinearly as the efficiency of the turbine shifts downward to maintain constant power output in the presence of increased orbital velocity. This is the consequence of shedding available energy so as to hold power output constant.

The projected area (maximum diameter multiplied by vane length) of the Savonius type rotor, together with coefficients for torque and power efficiency, are the primary determinants for performance. Power production of the present invention can continue to escalate as wave energy increases. The capability of the preferred embodiment to operate in higher wave conditions is limited primarily by capacity of the generator and the strength of the rotor structure.

Rotation rate and power management of the rotor in high wave and current conditions can be accomplished by any of several means such as: (a) power generation and loading; (b) unloading to allow the rotor to "free wheel"; (c) adjustment of the central gap between the overlapping vanes; (d) use of external appurtenances to restrict fluid flow into the rotor cavity; and (e) braking by means of mechanical or other resistive devices. Embodiments of the present invention do not require control surfaces, movement of the vanes, external appurtenances, or braking to limit rotation rate for survival in conditions of high fluid velocities. It should be understood that rotation rate decreases if higher capacity of a turbine is achieved by selecting larger diameters.

Figure 7:
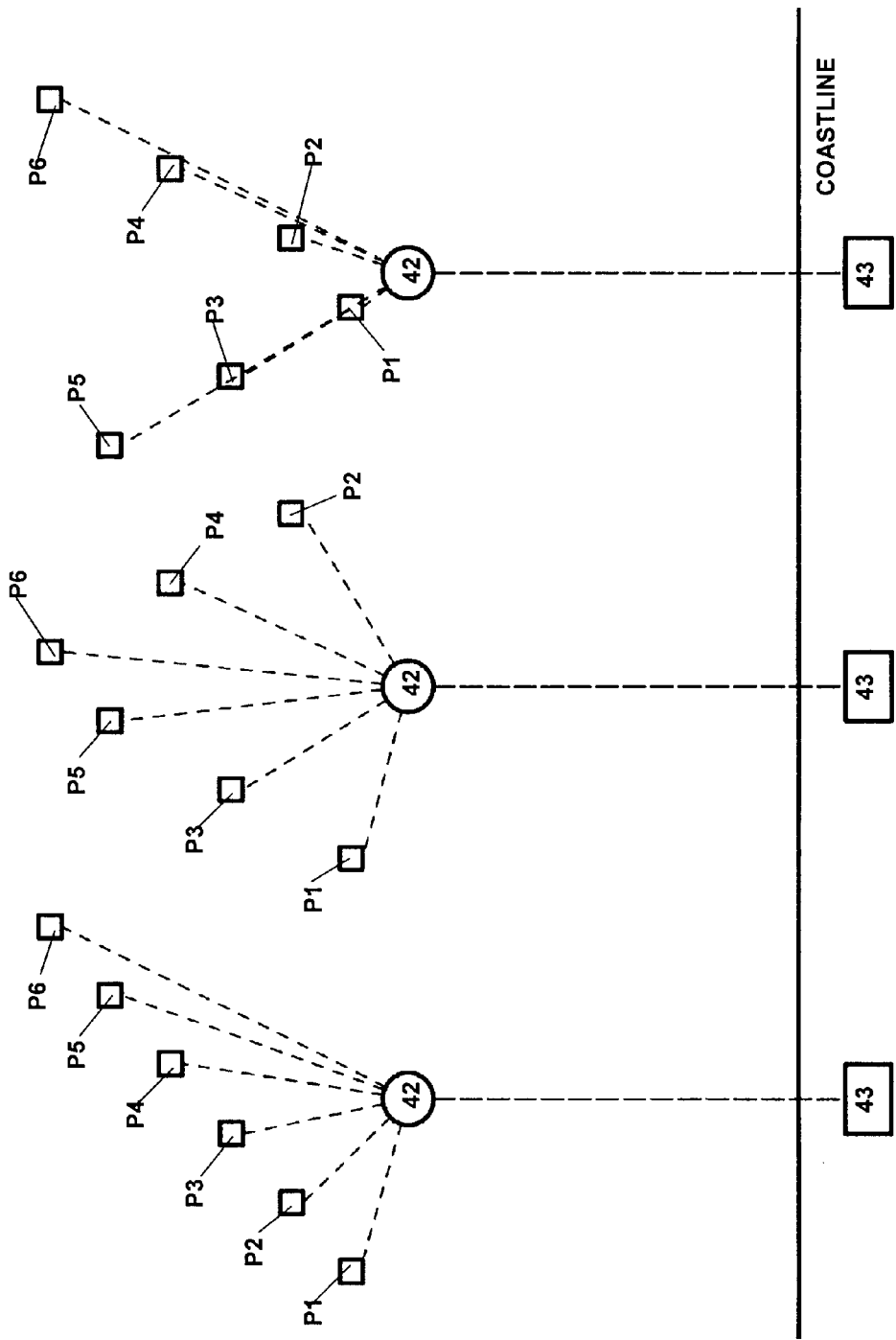
FIG. 7 is a schematic plan view illustrating some examples of a layout for installation of multiple water turbine units of the present invention arranged as arrays on the seafloor.

FIG. 7 is an illustration of possible placements of said horizontal axis rotor turbine units on the seafloor for commercial power production. The embodiments of said rotor turbine assemblies previously described can be deployed in arrays wherein the separation of the assemblies, orthogonal to the bathymetric contours, provides for several units to be within the span of wave lengths appropriate to the site. Each of the three arrays selected for illustration in FIG. 7 have a submerged junction box 42 which is the termination point for respective cables (indicated in dashed line) connecting individual generators of said rotor turbine assemblies at positions P1, P2, P3, P4, P5, and P6. Each of the junction boxes 42 are cable connected (indicated in dashed line) to a power conversion and control facility 49 ashore, as described hereinafter.

The number and distribution of said rotor turbine assemblies in an array are dictated by the local wave climate. Several different types and combinations of the rotor turbine embodiments previously described herein can be used in such arrays. The primary purpose of an array is to have rotor turbine units spatially distributed in relation to the incoming wave climate such that the summation of the time varying power is more nearly constant than would be produced by a single larger rotor. It should be understood that the array configurations shown in FIG. 7 are illustrative examples. The form, distribution, number of units, and selection of said rotor turbine assemblies may vary significantly depending on conditions at the site and the power service requirements.

Figure 8:
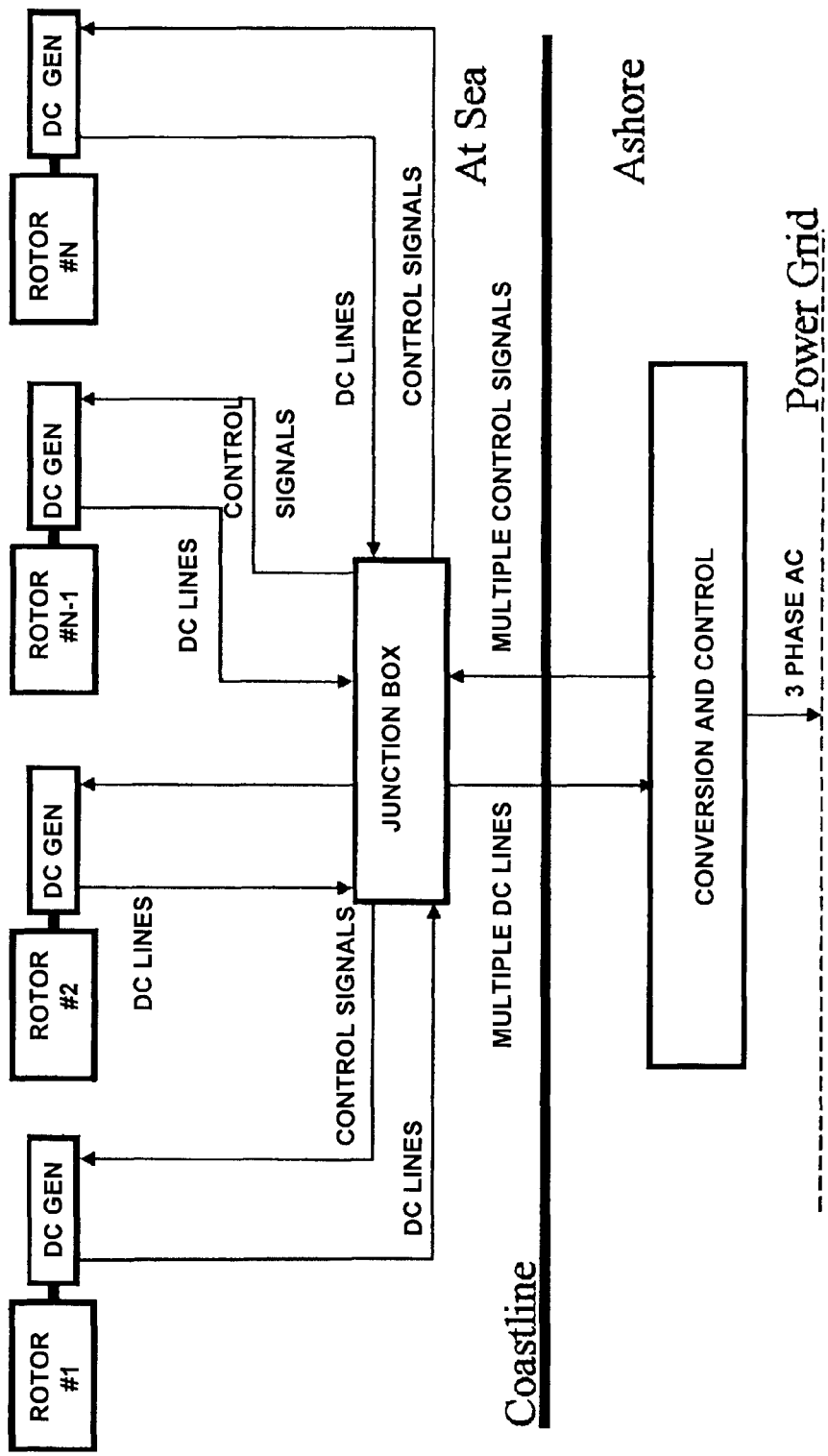
FIG. 8 is a block diagram illustrating an example of the power transmission, control, conversion, and delivery capability for the present invention.

FIG. 8 is a block diagram illustrating a generalized layout of electrical power generation, conversion, control and delivery to service a multiplicity of horizontal axis rotor turbines, in accordance with principles of the present invention. The number of rotor turbine assemblies in a field is selectable and may be individually cable connected or use the submerged junction box 42 for cable connection to the conversion and control facility 43 on the dry land side of the coastline.

Figure 9:
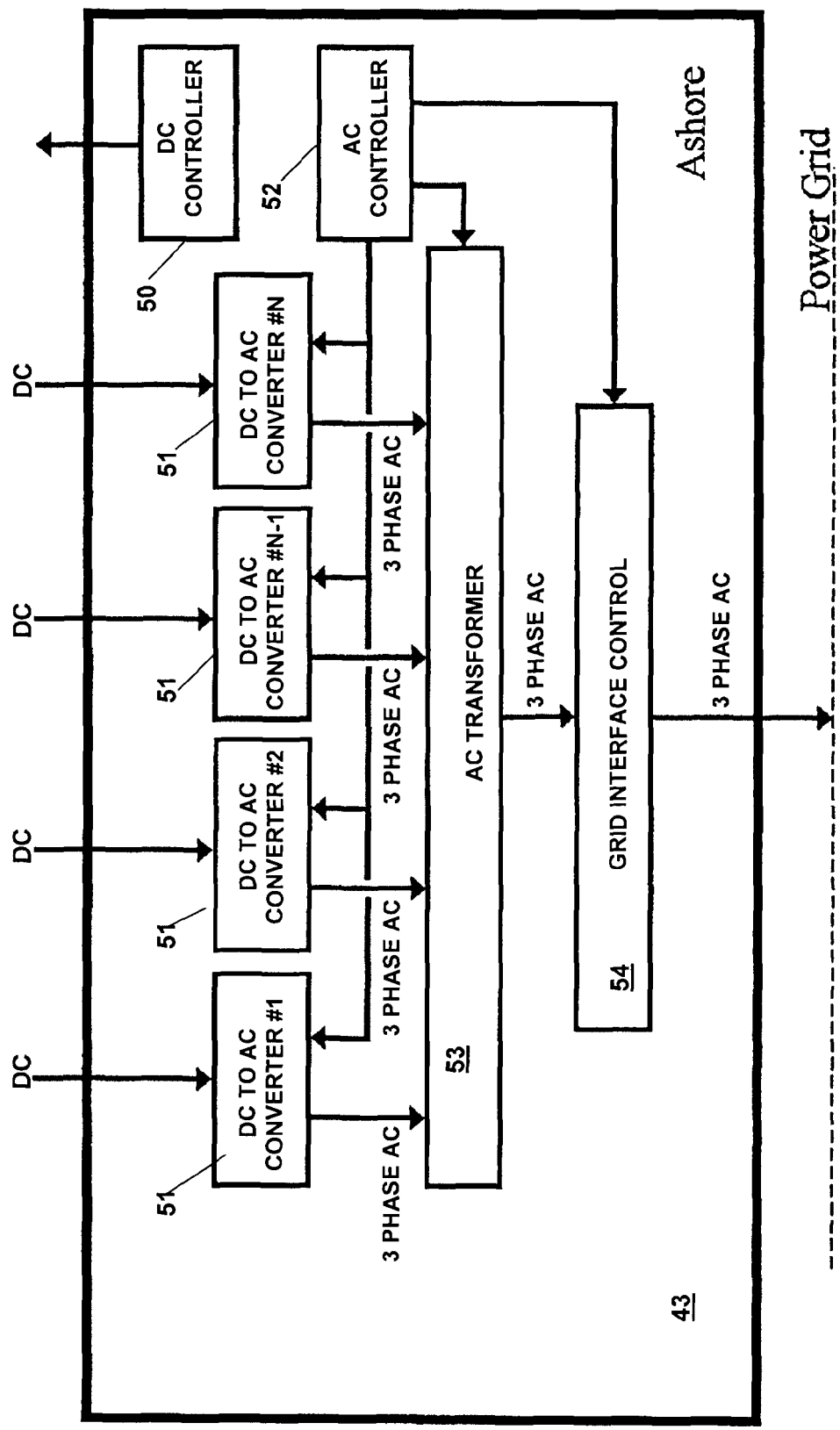
FIG. 9 is an electrical block diagram of the power control and conversion capability at a shore station.

FIG. 9 is a block diagram of the electrical system housed in the conversion and control facility 43 ashore that performs power control, conversion, conditioning, and delivery functions. A DC controller 50 regulates the power received from each turbine generator of the array. DC to AC converters 51, regulated by an AC controller 52, feed an AC transformer 53 to provide the conditioned power for a grid interface control unit 54 coupled to the regional electrical grid or other form of electrical load.

Although, for purposes of example, embodiments of the present rotors have been shown and described as Savonius type rotors with symmetrically arranged vanes in the form longitudinal half cylinders, it should be understood that alternative configurations of vanes and other components of horizontal axis rotor assemblies may be employed to suit operational requirements of the method.

While the methods and apparatus of the present invention have been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A method for generating electrical power using kinetic energy derived from vertically compressed substantially elliptical oscillating water particle orbits beneath refracted ocean surface waves, the method comprising the steps of:
   (a) providing an elongated rotor having a central horizontal axis and a pair of fixed longitudinal vanes of semicircular transverse cross section extending parallel to the central horizontal axis secured between circular end plates in opposed facing relation, the longitudinal vanes of semicircular transverse cross section having straight longitudinal edges that are diametrically offset and spaced apart in overlapped relation relative to one another defining a water passageway in fluid communication with the opposed facing interior and exterior semicircular curved surfaces of the vanes, the water passageway and opposed facing interior and exterior semicircular curved surfaces of the vanes configured to rotate the rotor in one direction about the central horizontal axis;
   (b) operatively connecting an electrical generator with the rotor for conversion of rotational energy of the rotor into electrical power;
   (c) mounting the electrical generator and the elongated rotor on a support structure with provision for rotation about the central horizontal axis, the elongated rotor, electrical generator, and support structure, forming a water turbine assembly;
   (d) completely submerging and securing the water turbine assembly to the seafloor a distance from the coastline beneath ocean surface waves in an operating zone between an offshore location and a nearshore location and at a depth where water particle motion beneath prevailing ocean surface waves in the operating zone is in the form of closed-loop vertically compressed substantially elliptical oscillating orbits having accentuated horizontal velocity with horizontal, vertical, and oblique velocity components caused by interaction with the seafloor during passage overhead of wave crests and troughs of ocean surface waves in the operating zone, said steps of submerging and securing the water turbine assembly including:

(e) securing the water turbine at a depth beneath the still water level such that the top of the rotor is completely submerged in the lower half of a vertical water column between the seafloor and the still water level so as to remain submerged and operational during passage of maximum wave crests and troughs of the overhead ocean surface waves in the operating zone during storm conditions, and to facilitate exposure to the closed-loop vertically compressed substantially elliptical oscillating water particle orbits near the seafloor; and (f) positioning the elevated central horizontal axis of the rotor generally parallel to bathymetric contours in the vicinity of the water turbine assembly to optimize alignment and exposure of the rotor with the horizontal, vertical, and oblique velocity components of the closed-loop vertically compressed substantially elliptical water particle orbits having accentuated horizontal velocity during passage of refracted overhead ocean surface waves in the operating zone; and thereafter (g) generating electrical power responsive to rotation of the elongated rotor in one direction about the central horizontal axis caused by the kinetic energy of oscillating flow and accentuated horizontal velocity of the vertically compressed substantially elliptical water oscillating particle orbits interacting with the water passageway and the interior and exterior curved surfaces of the opposed facing vanes during passage of crests and troughs of the overhead refracted ocean surface waves moving ashore in the operating zone.

2. The method according to claim 1, wherein said step of completely submerging and securing the water turbine assembly to the seafloor in the operating zone at a depth beneath the still water level includes:

completely submerging and securing the water turbine assembly to the seafloor in the operating zone at a depth beneath the still water level such that the bottom of the rotor is disposed above the seafloor a distance of less than approximately one-half of the diameter of the circular end plates;

orienting the elongated rotor of the water turbine assembly such that the direction of rotation at the top of the rotor is towards the coastline; and installing a water flow diverting ramp on a coastal facing side of the water turbine assembly generally parallel to, and offset from, the rotor, the ramp configured to accelerate the vertically compressed oscillatory flow into an entrance of the water passageway of the elongated rotor during passage overhead of wave troughs of incoming waves when the vertically compressed elliptical water particle motion having accentuated horizontal velocity constrained by the seafloor is moving in a direction away from the coast such that production of electrical power is enhanced during passage of wave troughs and is not affected during passage of wave crests when the horizontal component of orbital motion is reversed.

3. The method according to claim 1, comprising the further steps of:

providing a plurality of the water turbine assemblies as described in claim 1;

distributing, completely submerging, and securing each of said water turbine assemblies to the seafloor at selected distances apart relative to one another at locations within the operating zone with the central horizontal axes of the rotors of respective water turbine assemblies positioned in vertical planes generally parallel to bathymetric contours in the vicinity of each of the respective water turbine assemblies to facilitate exposure and alignment of the rotors with the horizontal, vertical, and oblique velocity components of the vertically compressed substantially elliptical oscillating water particle orbits having accentuated horizontal velocity during passage of refracted overhead ocean surface waves at the respective locations;

said step of distributing including spacing the water turbine assemblies apart at locations in the operating zone to form an array spaced transverse to the bathymetric contours, the number and spatial distribution of the water turbine assemblies in the array being correlated to local incoming ocean surface wave climate in the operating zone; and simultaneously operating the water turbine assemblies of the arrays, and combining the electrical power production to reduce temporal variability and collectively amplify and optimize power production and delivery such that the summation of the time varying power generated and delivered by the water turbine assemblies in the array is substantially constant.

* * * * *